2,976,220
PROCESS FOR THE CONVERSION OF BENZIMIDAZOLE-CONTAINING VITAMIN $B_{12}$ FACTORS, PARTICULARLY FACTOR III, TO VITAMIN $B_{12}$

Elisabeth Becher, Stockstadt (Main), and Konrad Bernhauer and Georg Wilharm, Aschaffenburg, Germany, assignors to Hoffmann-La Roche Inc., Nutley, N.J., a corporation of New Jersey No Drawing. Filed Feb. 4, 1959, Ser. No. 791,010

Claims priority, application Germany Feb. 19, 1958

1 Claim. (Cl. 195—114)

The benzimidazole-containing vitamin $B_{12}$ analogs differ from vitamin $B_{12}$ only in that the nucleotide portion of the former contains, in lieu of 5,6-dimethylbenzimidazole, a different benzimidazole derivative. The most important such benzimidazole factor of the vitamin $B_{12}$ group occurring in nature is factor III, which contains 5-hydroxybenzimidazole as its base. Factor III occurs abundantly, together with vitamin $B_{12}$, the purine factors and other vitamin $B_{12}$-like materials, in anaerobic digested sludge, from which it was first obtained [W. Friedrich and K. Bernhauer, Angewandte Chemie 65, 627 (1953)].

Factor III is the only vitamin $B_{12}$ analog hitherto found in nature which displays the same qualitative activity spectrum as vitamin $B_{12}$ itself. Thus, it is highly active, for example, against pernicious anemia [K. Bernhauer, Kj. Blumberger, P. Petrides, Arzneimittelforschung 5, 442 (1955)]. In the chick test, however, it is less active than vitamin $B_{12}$.

Accordingly, efforts have been made to increase the activity of factor III by converting it to derivatives. This has been effected primarily by methylation, whereby "factor IIIm" is obtained [W. Friedrich, K. Bernhauer, Chem. Ber. 89, 2030 (1956); German Auslegeschrift 1,004,343], which contains 5-methoxybenzimidazole as its base. The so obtained "factor IIIm" almost completely equals vitamin $B_{12}$, in a quantitative sense also, with respect to its biological activity. In this way factor III, occurring as a byproduct in the preparation of vitamin $B_{12}$ from anaerobic digested sludge, can be converted to an economically useful material.

According to the present invention an altogether different way for the conversion of factor III has been found; that is to say a direct conversion to vitamin $B_{12}$ by means of suitable microorganisms; whereby such microorganisms, especially propionic acid bacteria, are caused to grow and ferment in a conventional nutrient medium to which factor III and 5,6-dimethylbenzimidazole have been added. These materials are taken up by the bacterial cells and converted in the latter to vitamin $B_{12}$, whereby the base of factor III, i.e., 5-hydroxybenzimidazole, is eliminated and replaced by 5,6-dimethylbenzimidazole.

In copending application Serial No. 791,011, filed February 4, 1959, there is described a process whereby purine factors of the vitamin $B_{12}$ group are converted to benzimidazole-containing vitamin $B_{12}$ factors, especially vitamin $B_{12}$ itself, by means of microorganisms. This advance already was altogether novel and surprising. A fortiori, it is completely unexpected that microorganisms can convert to vitamin $B_{12}$ even different "benzimidazole factors" of the vitamin $B_{12}$ group.

That such result was not by any means to be expected appears from the fact that opinion based on experimental work inclined to the view that various "benzimidazole factors" could not be converted to vitamin $B_{12}$ in biological systems, such as *E. coli* 113–3 or *Ochromonas malhamensis* (S. K. Kon, Biochemical Society Symposium No. 13, Cambridge University Press, 1955, page 33; M. E. Coates and S. K. Kon, in K. Heinrich, Vitamin $B_{12}$ and Intrinsic Factor, Ferdinand Enke Verlag, Stuttgart, 1957, pages 78–79).

Moreover, the conversion according to the invention of benzimidazoles of the vitamin $B_{12}$ group, especially factor III, to vitamin $B_{12}$ is surprising on chemical grounds, inasmuch as the glycosidic linkage between a benzimidazole derivative and $C_1$ of ribose is known to be so firm that it cannot be split by action of acids without destruction of the ribose.

The process according to the invention is essentially executed as follows:

A culture e.g. of *Propionibacterium shermanii* is grown in a medium containing the required nutrient materials, such as especially sugar, a mixture of amino acids, phosphate and other nutrient salts. After incubation for two days at 28–30° C., the fermentation medium is mixed with the benzimidazole factor to be converted, such as factor III (which can also be used in crude unpurified condition) and with 5,6-dimethylbenzimidazole. The concentration of the benzimidazole factor in the medium amounts to about 5–20 mg. per liter, that of the 5,6-dimethylbenzimidazole to about 20–40 mg. per liter. By further addition of glucose to the nutrient medium and regulation of the pH value to about 6.5, the fermentation process is kept going for several days. After completion of the fermentation process the fermentation broth is centrifuged, whereby the pH value is adjusted to about 4–4.5 if required. The separated bacterial mass, which may be washed with water, is then extracted with water at an elevated temperature (e.g. at 80–110° C.). There is thus obtained an extract which already has an orange-red color. This extract is treated with activated carbon. The carbon adsorbate is obtained by filtration or centrifugation and eluted in the usual manner, for example, with aqueous alcohol. The thus obtained eluate already possesses the pure red color of vitamin $B_{12}$. From the eluate, crystalline vitamin $B_{12}$ is very easily obtained in known manner.

If the quantity of the benzimidazole factor, such as factor III, in the culture medium is selected at too high a value, it may happen that the benzimidazole factor will not be completely converted in the desired manner during processing. This can be recognized by the fact that a residual "$B_{12}$ activity" remains in the culture filtrate after recovery of the bacterial mass (for example, as demonstrated by test with *E. coli* or *L. leichmannii*). As shown by more detailed investigation, this activity is to be attributed to the presence of residues of benzimidazole factors such as factor III, which were not taken up by the bacteria, whereas the portions assimilated by the cells are practically quantitatively converted. The residual quantities of benzimidazole factors such as factor III in the culture filtrate can then be completely converted by subjecting the culture filtrate, after further addition of sugar, to renewed fermentation with the same bacteria, such fermentation being effected generally in the manner previously described.

In the technical execution of the process according to the invention, it is especially advantageous to start from a vitamin $B_{12}$ recovery process using anaerobic digested sludge. Two methods of procedure thereby come into consideration, viz.:

(1) A concentrate of various vitamin $B_{12}$ factors is obtained in the usual manner from anaerobic digested sludge, for example, in the form of a "kieselguhr product" (see German Auslegeschrift 1,016,898), and the vitamin $B_{12}$ and factor III are separated from the latter by cellulose chromatography (see German Patents 930,651 and 940,369 among others). Factor III, obtained in the fraction so recovered, is then converted to vitamin $B_{12}$ by means of the process of the invention.

(2) Starting from anaerobic digested sludge, there is prepared merely an aqueous extract, or a raw concentrate, for example in the form of a bentonite- or carbon-eluate, which contains e.g., in addition to factor III, also purine factors and vitamin $B_{12}$. In this case, the procedure according to the invention can be very advantageously employed, so that by means of the processing in the presence of 5,6-dimethylbenzimidazole, the factor III present is converted to vitamin $B_{12}$, and also simultaneously the purine factors present are similarly converted, cf. copending application Serial No. 791,011, filed February 4, 1959.

The process according to the invention possesses the following additional desirable technical advantage: Factor III is taken up by the bacterial cells and in these is converted to vitamin $B_{12}$ in the presence of 5,6-dimethylbenzimidazole, the vitamin $B_{12}$ being retained in the cells. This permits the simple recovery of vitamin $B_{12}$ by separating the bacterial cells and isolating vitamin $B_{12}$ from them.

If, however, it is not desired to work up the bacterial mass, obtained acording to the above described process, to vitamin $B_{12}$, but rather to use it as a feed additive (APF product), then it is only necessary to dry the bacterial mass. The so obtained dry product possesses a relatively very high content of vitamin $B_{12}$, that is to say usually well over 100 mg. per kg. It can be mixed with other suitable feed materials, such as soya meal, bran, etc., and thus be adjusted to the desired vitamin $B_{12}$ content. As will be obvious, an APF product containing vitamin $B_{12}$ made according to the present process is much more useful than such a product which contains other benzimidazole factors.

The technical advance obtainable according to the process of the invention is quite obvious, and resides in the fact that by means of said process factor III, obtainable for instance as a by-product of vitamin $B_{12}$ recovery from anaerobic digested sludge, can be converted to vitamin $B_{12}$ and so can be transformed to an economically useful product.

Details concerning the execution of the process of the invention are obvious from the following examples:

*Example 1*

A medium containing the following components per liter and adjusted to pH 6.7 is sterilized in the usual manner (30 minutes at 120° C.):

| | |
|---|---|
| Acid hydrolyzed casein corresponding to ___g. N__ | 1.1 |
| Trypsin digester casein corresponding to ___g. N__ | 1.6 |
| $NaH_2PO_4$ _____g__ | 1.76 |
| $K_3PO_4$ _____g__ | 1.76 |
| $MgCl_2.6H_2O$ _____g__ | 0.4 |
| $FeSO_4 7H_2O$ _____mg__ | 10 |
| Yeast extract _____g__ | 3 |
| Technical glucose _____g__ | 10 |

Then the medium is inoculated with one liter of a culture of *Propionibacterium shermanii* in the same medium, and the whole is incubated under anaerobic conditions at 28–30° C. After fermentation for two days, the mixture is combined with a sterile solution of 50 mg. of factor III and 200 mg. of 5,6-dimethylbenzimidazole. During the process, sterile glucose solution is added from time to time in order to maintain the fermentation, and the pH value is regulated to 6.6 by addition of saturated sodium carbonate solution. When two more days have passed, 200 mg. of 5,6-dimethylbenzimidazole is again added. After six days the fermentation process is ended. The mixture is acidified by addition of sulfuric acid to a pH value of 4.0, whereupon the bacteria are caused to settle. By centrifugation there are obtained 275 g. of bacterial mass having a dry substance content of 30%. The damp bacterial mass is extracted with water several times, during 10 minute periods, at 110° C. under pressure, whereby there is obtained a total of 2.6 liters of an orange-red aqueous extract. After cooling, this is mixed, while stirring, with 26 g. of activated carbon. The latter is filtered with suction through diatomaceous earth, and the carbon adsorbate is repeatedly eluted at boiling temperature with a mixture of 70 parts by volume of isopropanol, 25 parts by volume of water and 5 parts by volume of benzene until the eluate runs practically colorless. There is thus obtained one liter of a pure red colored eluate, which is concentrated in vacuum to a small volume. From the concentrate, 32 mg. of crystalline vitamin $B_{12}$ is obtained in known manner. This is identified by determination of its characteristics, particularly its electrophoretic behavior at pH 11, that is under conditions such that vitamin $B_{12}$ is neutral, whereas factor III migrates to the anode [in this connection, see W. Friedrich and K. Bernhauer, Chem. Ber. 90, 154 (1957)]. Its identity is established by paper chromatography also, by use of the usual development systems. Finally, the employment of water-saturated secondary butanol plus 0.01% HCN plus 0.5% sodium tetraphenylborate results in an unequivocal indication that vitamin $B_{12}$ is present, but not factor III*m*, since the latter in the development system referred to possesses a much lower $R_f$ value than vitamin $B_{12}$ (factor III*m*: $R_{B_{12}}=0.67$ in the developer referred to, 24 hours, ascending at 20–22° C.).

*Example 2*

100 liters of an aqueous solution obtained by heating anaerobic digested sludge after elimination of solid materials by centrifugation in known manner and having a vitamin $B_{12}$ activity of 3.8 mg. per liter in the *E. coli* test and containing factor III in addition to purine factors of the vitamin $B_{12}$ group, is mixed with 1 kg. of technical glucose and sterilized in known manner. Then the mixture was inoculated with 10 liters of a culture of Propionibacterium W–10 in the same medium described in Example 1. The whole is incubated under anaerobic conditions at 28–30° C. After fermentation for two days the mixture is combined with a sterile solution of 2 g. of 5,6-dimethylbenzimidazole, and the fermentation process is maintained for six days by addition of sterile glucose solution from time to time and regulation of the pH value to 6.6 by addition of concentrated soda solution.

Working up of the fermentation broth is effected in similar manner to Example 1. The fermentation broth is mixed with sulfuric acid until a pH value of 4.0 is reached. The thus flocculated bacteria are separated by centrifugation. Thus there is obtained 2.7 kg. of a bacterial mass having a dry substance content of 30%. From the damp bacterial mass there is obtained, in the manner described in Example 1, 32 liters of an aqueous extract, which is treated with 320 g. of activated carbon. The carbon adsorbate obtained by centrifugation is eluted exhaustively at boiling temperature with a mixture of 70 parts by volume of isopropanol, 25 parts by volume of water and 5 parts by volume of benzene. From the combined pure red colored eluates (14.5 liters), vitamin $B_{12}$ is recovered in known manner. As shown by more detailed examination, the vitamin $B_{12}$-factor III in the original medium has now disappeared and has been converted into vitamin $B_{12}$. The same obtains for the purine factors of the vitamin $B_{12}$ group contained in the starting medium.

*Example 3*

2 liters of a culture medium which contains 1% glucose, 0.5% peptone, 0.5% meat extract, 0.5% sodium chloride and 0.1% yeast extract, are sterilized in a manner known per se and inoculated with 2.5% of a 48 hours' old culture of Streptomyces spec. ATCC 11072 in the same medium. The culture is then incubated under aerobic conditions for 5 days at 48° C., whereby after the first 24 hours of incubation 5 mg. of factor III and 40 mg. of 5,6-dimethylbenzimidazol are added. The pH which before incubation was 7.2 was raised after the end of the incubation to 7.4. To the culture is added so much of a potassium cyanide solution, that it contains 0.05% of cyanide ions, and the culture is heated for 10 minutes to 110° C. The filtrate obtained by separating off and pressing the mycelium is stirred for ½ hour with 1% of activated carbon. The latter is filtered with suction through diatomaceous earth, in accordance with Example 1, and the carbon adsorbate repeatedly eluted. The eluate is concentrated in vacuum to a small volume. The concentrate is then purified by phenol extraction according to known procedure. The mixture of vitamin $B_{12}$ factors thus obtained is separated electrophoretically and yields 33% of vitamin $B_{12}$ and 67% unchanged starting factor III.

We claim:

A process for the preparation of vitamin $B_{12}$ which comprises growing *Propionibacterium shermanii* in a culture medium comprising factor III and 5,6-dimethylbenzimidazole under anaerobic conditions.

References Cited in the file of this patent

Ford et al.: Biochem. Jour., vol. 59, No. 1, January 1955, pages 86 to 93.